(12) United States Patent
Takeo

(10) Patent No.: US 6,704,452 B1
(45) Date of Patent: Mar. 9, 2004

(54) METHOD, APPARATUS AND RECORDING MEDIUM FOR IMAGE DECODING

(75) Inventor: Hideya Takeo, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 466 days.

(21) Appl. No.: 09/580,555

(22) Filed: May 30, 2000

(30) Foreign Application Priority Data

May 27, 1999 (JP) .......................................... 11-148123

(51) Int. Cl.[7] ................................................ G06K 9/36
(52) U.S. Cl. ...................................................... 382/233
(58) Field of Search ................................. 382/232–248

(56) References Cited

U.S. PATENT DOCUMENTS

| | | | |
|---|---|---|---|
| 5,832,120 A | * 11/1998 | Prabhakar et al. | 382/233 |
| 5,864,637 A | * 1/1999 | Liu et al. | 382/233 |
| 5,991,515 A | * 11/1999 | Fall et al. | 382/233 |
| 6,002,794 A | * 12/1999 | Bonneau et al. | 382/233 |
| 6,393,152 B2 | * 5/2002 | Takahashi et al. | 382/233 |

OTHER PUBLICATIONS

Parthasarathy Sriram et al. "Image Coding Using Wavelet Transforms and Entropy–Constrained Trellis–Coded Quantization" vol. 4, pp. 725–733, Jun. 1995.
Amir Said et al. "A New, Fast, and Efficient Image Codec Based on Set Partitioning in Hierarchical Trees" vol. 6, pp. 243–250, Jun. 1996.

* cited by examiner

*Primary Examiner*—Jingge Wu
(74) *Attorney, Agent, or Firm*—Sughrue Mion, PLLC

(57) ABSTRACT

Image data coded in a multi-structure bit stream format are decoded in accordance with a request upon decoding. Image data having been coded according to a coding method adopting a wavelet transform are read from storing means and input to decoding means. A decoding mode selected from decoding modes comprising a standard mode, a semi-fast mode, and a fast mode is input from input means, and the coded image data are decoded by the decoding means in accordance with the decoding mode having been input. For example, in the standard mode, decoding is carried out up to a highest resolution and decoded image data are obtained by carrying out an inverse wavelet transform thereon. The decoded image data are input to reproduction means and reproduced.

18 Claims, 2 Drawing Sheets

FIG.1
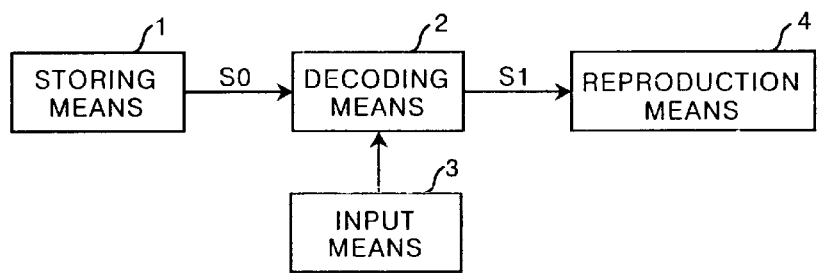
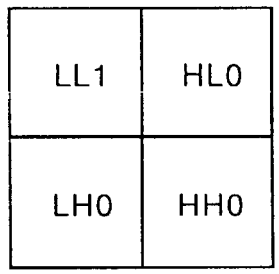
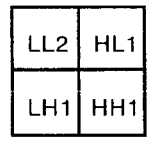
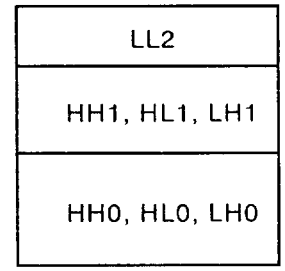
FIG.2A  FIG.2B  FIG.2C

METHOD, APPARATUS AND RECORDING MEDIUM FOR IMAGE DECODING

BACKGROUND OF THE INVENTION

1. Field of the Invention

The present invention relates to a method and an apparatus for decoding image data having been coded in a multi-structure bit stream format according to a method such as wavelet transform or DCT for a JPEG file. The present invention also relates to a computer-readable recording medium storing a program to cause a computer to execute the image decoding method.

2. Description of the Related Art

In the field of data compression, such as image data compression by an image server of a medical network or general data compression in communications or filing, various algorithms have been proposed. For example, as efficient compression algorithms, a WTCQ method (P. Siram and M. W. Marcellin, "Image coding using wavelet transforms and entropy constrained trellis-coded quantization", IEEE Transactions on Image Processing, vol. 4, pp. 725–733, June 1995) or a SPIHT method (A. Said and W. A. Pearlman, "A New Fast and Efficient Image Codec Based on Set Partitioning in Hierarchical Trees", IEEE Transactions on Circuits and Systems for Video Tech., vol. 6, pp. 243–250, June 1996) have been proposed. In these methods, original image data representing an original image are subjected to a wavelet transform and transformed image data at multiple resolutions are obtained. The transformed image data are then classified and bit allocation is determined. According to the bit allocation having been determined, quantized data are obtained by quantization using a TCQ method. The quantized data are then subjected to entropy coding and coded image data are generated.

In the coding method using the wavelet transform, the original image data are converted into image data in a multi-resolution space representing an object in a plurality of frequency bands, and the coded image data have a multi-structure bit stream format.

In DCT used in the field of general JPEG compression, original image data are divided into blocks and subjected to discrete cosine transform (DCT). Bit allocation is then determined and quantization is carried out on the transformed data according to the bit allocation. The quantized data having been generated in this manner are then coded to generate coded data. In the coding method using DCT, data in each block are decomposed into a direct current component and an alternating current component. The alternating current component represents an object from low to high frequencies in each block. Therefore, the coded image data have a multi-structure bit stream format.

An object of the present invention is to provide a method and an apparatus for decoding, in a desired mode, coded image data having a multi-structure bit stream format as has been described above and also to provide a computer-readable recording medium storing a program to cause a computer to execute the image decoding method.

SUMMARY OF THE INVENTION

An image decoding method of the present invention is an image decoding method for obtaining decoded image data by decoding coded image data having been generated by coding image data in a multi-structure bit stream format, and the image decoding method is characterized by that the coded image data are decoded by changing a degree of decoding.

"Coding image data in a multi-structure bit stream format" means coding after image data have been converted into a multi-resolution space by a wavelet transform or DCT as has been described above.

"Changing a degree of decoding" means decoding enabling reproduction up to a highest resolution for a high-quality image in the multi-structure bit stream format, or decoding up to an intermediate resolution in order to shorten an operation time for decoding at the cost of image quality sacrifice to some degree. In the case of decoding up to an intermediate resolution, enlargement by using an interpolation operation to have the same size as the original image data is included as "decoding" in the present invention.

It is preferable for the image decoding method of the present invention to enable selection of a plurality of decoding modes predefined in accordance with the degree of decoding so that the coded image data can be decoded in accordance with one of the decoding modes having been selected.

Furthermore, it is preferable for one of the decoding modes to define the degree of decoding based on the operation time for decoding and further to define the degree of decoding based on the quality of an image obtained by reproduction of the decoded image data.

Moreover, it is preferable for one of the decoding modes to define the degree of decoding based on the kind of output means for outputting the decoded image data. Furthermore, it is also preferable for one of the decoding modes to define the degree of decoding based on usage of the decoded image data.

An image decoding apparatus of the present invention is an image decoding apparatus for obtaining decoded image data by decoding coded image data having been generated by coding image data in a multi-structure bit stream format, and the image decoding apparatus comprises:

decoding means for decoding the coded image data by changing the degree of decoding.

It is preferable for the image decoding apparatus of the present invention to further comprise selection means for selecting a plurality of decoding modes predefined in accordance with the degree of decoding. It is also preferable for the decoding means of the present invention to decode the coded image data according to one of the decoding modes selected by the selection means.

Furthermore, it is also preferable for one of the decoding modes in the image decoding apparatus of the present invention to define the degree of decoding based on an operation time for decoding. Moreover, it is also preferable for one of the decoding modes to define the degree of decoding based on the quality of an image obtained by reproduction of the decoded image data.

It is also preferable for one of the decoding modes to define the degree of decoding based on the kind of output means for outputting the decoded image data. Furthermore, it is also preferable for one of the decoding modes to define the degree of decoding based on usage of the decoded image data.

The image decoding method of the present invention may be provided as a computer-readable recoding medium storing a program to cause a computer to execute the method.

According to the present invention, when coded image data in a multi-structure bit stream format are decoded, the degree of decoding can be changed. Therefore, coded image data can be decoded to a desired degree of decoding, in response to a request upon decoding. For example, when reduction in the operation time is necessary, the degree of decoding is changed not to decode to the highest resolution. When a high-quality image is desired, the degree of decoding is changed to decode up to the highest resolution.

Moreover, by enabling selection of the decoding mode from the predefined decoding modes, the degree of decoding can be changed easily, which improves convenience for users.

BRIEF DESCRIPTION OF THE DRAWINGS

FIG. 1 is a block diagram showing an outline configuration of an image decoding apparatus according to an embodiment of the present invention;

FIGS. 2A through 2C are diagrams showing states of coding image data in a hierarchy by using a wavelet transform;

DESCRIPTION OF THE PREFERRED EMBODIMENT

Figure 3:
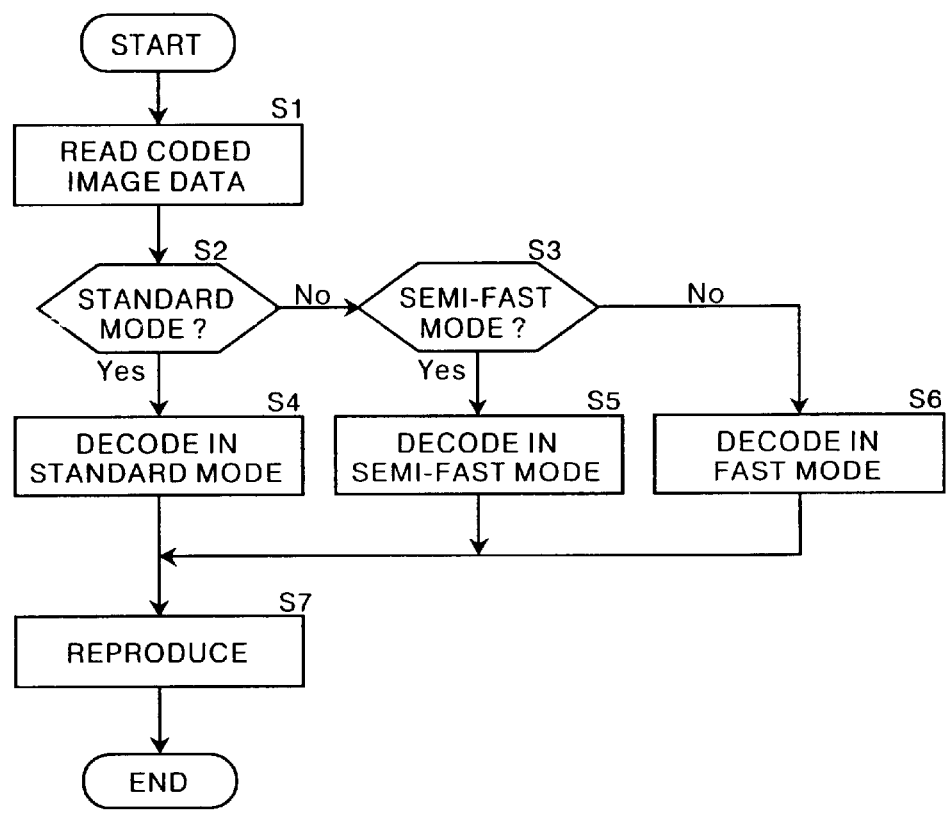
FIG. 3 is a flow chart showing an operation of the embodiment of the present invention.

Hereinafter, an embodiment of the present invention will be explained with reference to the accompanying drawings.

FIG. 1 is a block diagram showing an outline configuration of an image decoding apparatus according to the embodiment of the present invention. In this embodiment, coded image data S0 obtained by coding original image data according to a coding method using a wavelet transform are decoded. As shown in FIG. 1, the image decoding apparatus according to this embodiment comprises storing means 1 for storing the coded image data S0, decoding means 2 for decoding the coded image data S0 read from the storing means 1, input means 3 such as a mouse and a keyboard for setting a mode of decoding by the decoding means 2, and reproduction means 4 such as a monitor and a printer for reproducing decoded image data S2 obtained by the decoding.

The original image data are decomposed and coded into hierarchical data in the following manner and stored in the storing means 1. As shown in FIG. 2A, the image data are subjected to a wavelet transform and decomposed into four data sets LL1, HL0, LH0, and HH0 at respective resolutions. The data set LL1 represents an image whose width and length are ½ of those of the original image, and the data sets HL0, LH0 and HH0 represent images of vertical, horizontal, and diagonal edge components, respectively. As shown in FIG. 2B, the data set LL1 is further subjected to the wavelet transform and four data sets LL2, HL1, LH1 and HH1 are obtained. The data set LL2 represents an image whose width and length are ½ of the image of the data set LL1, and the data sets HL1, LH1 and HH1 represent images of vertical, horizontal, and diagonal edge components of the data set LL1, respectively. The wavelet transform is repeated as many times as desired on data LL obtained at each preceding wavelet transform and data at multiple resolutions can be obtained. As shown in FIG. 2C, the data at each resolution are then coded and stored in the storing means 1 as the coded image data S0 comprising one file.

One of three decoding modes "standard", "semi-fast", and "fast" is input selectively from the input means 3. The mode may be selected by inputting a number representing the mode or by a click on the mode displayed on the monitor (not shown in FIG. 1) with the mouse.

The "standard" mode is a mode for obtaining decoded image data S1 by decoding the coded image data S0 to a highest resolution and then by carrying out an inverse wavelet transform on the decoded hierarchical data. The "semi-fast" mode is a mode for obtaining the decoded image data S1 by decoding the coded image data S0 to a resolution ½ of the highest resolution and carrying out the inverse wavelet transform on the hierarchical data decoded to the ½ resolution and on highest resolution data with 0 being inserted as values of the highest resolution data. In the "fast" mode, the coded image data S0 are decoded to the resolution ½ of the highest and the decoded hierarchical data up to the ½ resolution are subjected to the inverse wavelet transform. Thereafter, the decoded image data are enlarged by a factor of 2 by using linear interpolation and the decoded image data S1 having the same size as the original image data are obtained.

The operation time for decoding is longer in the order of the standard mode, the semi-fast mode, and the fast mode. Therefore, decoding can be carried out fastest in the fast mode. The quality of an image obtained by decoding is higher in the order of the standard mode, the semi-fast mode, and the fast mode. Therefore, the image quality is highest in the standard mode. Decoding is carried out only up to ½ resolution in the semi-fast mode and in the fast mode. However, since the subsequent processing is carried out by using the wavelet transform in the semi-fast mode and the linear interpolation in the fast mode, processing speed is faster in the fast mode and the image quality is higher in the semi-fast mode. A result of simulation by Fuji Photo Film Co., Ltd using a chest X-ray image is shown below. In Table 1, PSNR is a value as an index of image quality.

TABLE 1

|  | Processing time | PSNR (dB) |
| --- | --- | --- |
| Standard mode | 1.00 | 50.21 |
| Semi-fast mode | 0.74 | 49.89 |
| Fast mode | 0.59 | 49.64 |

An operation of this embodiment will be explained next. FIG. 3 is a flow chart showing the operation of this embodiment. The coded image data S0 are read from the storing means 1 (step S1), and the decoding mode input from the input means 3 is judged (steps S2 and S3). When the decoding mode having been input is the standard mode, a result of step S2 is confirmative. The coded image data S0 are decoded in the standard mode and the decoded image data S1 are obtained (step S4).

Meanwhile, when the decoding mode is the semi-fast mode, the result of step S2 is negative while a result of step S3 is positive. The coded image data S0 are decoded in the semi-fast mode and the decoded image data S1 are obtained (step S5). Furthermore, when the decoding mode is the fast mode, the results of steps S2 and S3 are negative, and the coded image data S0 are decoded in the fast mode. In this manner, the decoded image data S1 are obtained (step S6). The decoded image data S1 are reproduced by the reproduction means 4 (step S7), and the processing is completed.

As has been described above, in this embodiment, the degree of decoding the coded image data S0 is changed in accordance with the decoding mode input from the input means 3. Therefore, the decoded image data S1 having been decoded appropriately in accordance with a request upon decoding can be obtained.

The performance of an apparatus to reproduce the decoded image data S1 varies, depending on the apparatus.

A high-performance apparatus can reproduce a high-quality image, while a modest-performance apparatus cannot reproduce a high-quality image due to a long operation time for decoding. Therefore, the image-data coding method has been changed conventionally in accordance with the reproduction apparatus, and coded image data according to the reproduction apparatus have been obtained. In this case, if an image needs to be reproduced by another reproduction apparatus, it is necessary to change the coding method (that is, trans-coding is necessary) in accordance with the reproduction apparatus, which is inefficient. By applying the image decoding apparatus of the present invention to such a case, no trans-coding is necessary as long as the coded image data S0 exist, since the degree of decoding can be changed in accordance with the reproduction apparatus.

Figure 4:
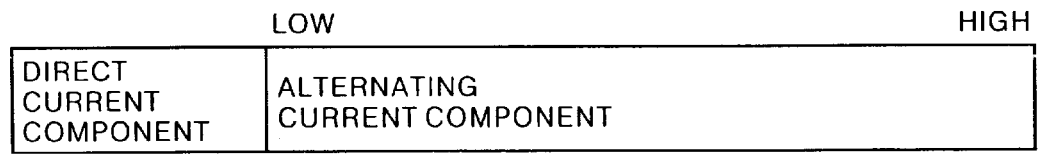
FIG. 4 is a diagram showing coded image data obtained by DCT.

In the embodiment described above, the coded image data S0 have been obtained by coding the original image data in a hierarchical structure through the wavelet transform. However, coded image data S0 obtained by using DCT may be used. In this case, the original image data are divided into a plurality of blocks in a DCT method, and direct and alternating current components are generated for each block. By coding these components, the coded image data S0 are obtained. At this time, since the alternating current component shows an object from low to high frequencies in each block, the operation time for decoding and the quality of an image obtained by reproducing the decoded image data S1 can be changed by changing the degree of decoding the alternating current component. In other words, as shown in FIG. 4, the coded image data S0 in each block comprise the direct current component and the alternating current component, and the decoded image data S1 have high quality by decoding the alternating current component to a highest frequency, although the decoding time becomes longer. Meanwhile, when the alternating current component is decoded up to a frequency lower than the highest, the operation time can be reduced although the image quality is degraded to some degree. Therefore, by changing the degree of decoding the alternating current component, the degree of decoding can be changed as in the embodiment described above, and the decoded image data S1 having been decoded appropriately in accordance with a request upon decoding can be obtained.

In the above embodiment, the decoding mode has been selected from the standard mode, the semi-fast mode and the fast mode by using the input means 3. However, the decoding modes are not necessarily limited to these modes. Only the standard mode and the fast mode may be used, for example. Furthermore, various kinds of modes, such as a faster mode in which decoding is carried out only up to ¼ of the highest resolution, may be selected. Alternatively, a desired degree of decoding may be specified by characters input from the input means 3.

In the above embodiment, the degree of decoding has been changed by selecting the decoding mode from the standard mode, the semi-fast mode and the fast mode by using the input means 3. However, the degree of decoding can be changed in accordance with an output destination of the decoded image data S1, instead of directly selecting the three decoding modes described above.

More specifically, the decoding modes may be specified by selecting a "laser printer" or a "CRT monitor" as the output destination by using the input means 3. When the "laser printer" is selected, the decoded image data S1 are obtained by decoding the coded image data S0 according to the standard mode which prioritizes image quality. Meanwhile, some CRT monitors cannot reproduce images in substantially high quality even if image data themselves can reproduce high quality images. Therefore, when the "CRT monitor" is selected as the output destination, the decoded image data S1 are obtained by decoding the coded image data S0 according to the fast mode enabling fast decoding.

In the case where the coded image data S0 are obtained by coding image data representing a radiation image, it is preferable for an image to be reproduced in a radiological ward to have high quality, since a detailed diagnosis by observing the radiation image needs to be carried out. Meanwhile, a radiation image is used merely as a reference in a clinical ward, and the radiation image does not need to have substantially high quality. Therefore, the decoding mode may be specified by selecting a "terminal in radiological ward" or a "terminal in clinical ward" as the output destination by using the input means 3. When the "terminal in radiological ward" is selected, the decoded image data S1 are obtained by decoding the coded image data S0 according to the standard mode prioritizing image quality. When the "terminal in clinical ward" is selected, the decoded image data S1 are obtained by decoding the coded image data S0 according to the "fast mode" enabling fast decoding.

Furthermore, the degree of decoding may be changed according to usage of the decoded image data S1. For example, when the coded image data S0 are obtained by coding image data representing a radiation image, an image to be reproduced preferably has high quality when used in a primary diagnosis, since detailed comments need to be made by observing the radiation image. On the other hand, when a diagnosis using an image in the past is carried out, such as in the case of progress observation, the image does not need to have such high quality as in the primary diagnosis, although the quality needs to be high to some degree. When a radiation image is used as a reference, the image does not need to have substantially high quality. Therefore, the decoding mode may be specified by selecting "for primary diagnosis" or "for progress diagnosis" or "for reference" by using the input means 3. When "for primary diagnosis" is selected, the decoded image data S1 are obtained by decoding the coded image data S0 according to the standard mode prioritizing image quality. When "for progress diagnosis" is selected, the decoded image data S1 are obtained by decoding the coded image data S0 according to the semi-fast mode for modest image quality. When "for reference" is selected, the decoded image data S1 are obtained by decoding the coded image data S0 according to the fast mode enabling fast decoding.

What is claimed is:

1. An image decoding method for obtaining decoded image data by carrying out decoding of coded image data having been obtained by coding image data in a multi-structure bit stream format, the image decoding method comprising the step of:

decoding the coded image data by changing a degree of the decoding, further comprising the step of enabling selection of a decoding mode from a plurality of decoding modes predefined in accordance with the degree of the decoding, wherein the coded image data are decoded in accordance with the decoding mode having been selected.

2. An image decoding method as claimed in claim 1, wherein one of the decoding modes defines the degree of the decoding based on an operation time for decoding.

3. An image decoding method as claimed in claim 1 or 2, wherein one of the decoding modes defines the degree of the decoding based on the quality of an image obtained by reproduction of the decoded image data.

4. An image decoding method as claimed in any one of claims to 1 to 2, wherein one of the decoding modes defines the degree of the decoding based on the kind of output means for outputting the decoded image data.

5. An image decoding method as claimed in any one of claims 1 to 2, wherein one of the decoding modes defines the degree of the decoding based on usage of the decoded image data.

6. An image decoding apparatus for obtaining decoded image data by carrying out decoding of coded image data having been obtained by coding image data in a multi-structure bit stream format, the image decoding apparatus comprising:

decoding means for decoding the coded image data by changing a degree of the decoding, further comprising selection means for selecting a decoding mode from a plurality of decoding modes predefined in accordance with the degree of the decoding, wherein the decoding means decodes the coded image data in accordance with the decoding mode having been selected by the selection means.

7. An image decoding apparatus as claimed in claim 6, wherein one of the decoding modes defines the degree of the decoding based on an operation time for decoding.

8. An image decoding apparatus as claimed in claim 6 or 7, wherein one of the decoding modes defines the degree of the decoding based on the quality of an image obtained by reproduction of the decoded image data.

9. An image decoding apparatus as claimed in any one of claims 6 to 7, wherein one of the decoding modes defines the degree of the decoding based on the kind of output means for outputting the decoded image data.

10. An image decoding apparatus as claimed in any one of claims 6 to 7, wherein one of the decoding modes defines the degree of the decoding based on usage of the decoded image data.

11. A computer-readable recording medium storing a program to cause a computer to execute an image decoding method for obtaining decoded image data by carrying out decoding of coded image data having been obtained by coding image data in a multi-structure bit stream format, the program comprising the procedure of:

decoding the coded image data by changing a degree of the decoding, the program further comprising the procedure of selecting a decoding mode from a plurality of decoding modes predefined in accordance with the degree of the decoding, and the procedure of decoding being a procedure of decoding the coded image data according to the decoding mode having been selected.

12. A computer-readable recording medium as claimed in claim 11, wherein one of the decoding modes defines the degree of the decoding based on an operation time for decoding.

13. A computer-readable recording medium as claimed in 11 or 12, wherein one of the decoding modes defines the degree of the decoding based on the quality of an image obtained by reproducing the decoded image data.

14. A computer-readable recording medium as claimed in any one of claims 11 to 12, wherein one of the decoding modes defines the degree of the decoding based on the kind of output means for outputting the decoded image data.

15. A computer-readable recording medium as claimed in any one of claims 11 to 12, wherein one of the decoding modes defines the degree of the decoding based on usage of the decoded image data.

16. The image decoding method as claimed in claim 3, wherein one of the decoding modes defines at least one of: degree of decoding based on the kind of output means for outputting the decoded image and the degree of decoding based on usage of the decoded image.

17. The image decoding apparatus according to claim 8, wherein one of the decoding modes defines at least one of: degree of decoding based on the kind of output means for outputting the decoded image and the degree of decoding based on usage of the decoded image.

18. The computer-readable recording medium according to claim 13, wherein one of the decoding modes defines at least one of: degree of decoding based on the kind of output means for outputting the decoded image and the degree of decoding based on usage of the decoded image.

* * * * *